United States Patent [19]

Lew et al.

[11] Patent Number: 4,699,012
[45] Date of Patent: Oct. 13, 1987

[54] VORTEX SHEDDING FLOW METER WITH STRESS CONCENTRATION SIGNAL ENHANCEMENT

[75] Inventors: Hyok S. Lew, Arvada; Louis T. Yoshida, Longmont, both of Colo.

[73] Assignee: Engineering Measurements Company, Longmont, Colo.

[21] Appl. No.: 788,840

[22] Filed: Oct. 18, 1985

[51] Int. Cl.⁴ .............................................. G01F 1/32
[52] U.S. Cl. .............................. 73/861.24; 73/DIG. 4
[58] Field of Search ............... 73/861.22, 861.24, 189, 73/DIG. 4

[56] References Cited

U.S. PATENT DOCUMENTS

| | | | |
|---|---|---|---|
| 4,069,708 | 1/1978 | Fussell, Jr. ........................ | 73/861.24 |
| 4,248,098 | 2/1981 | Sawayama et al. ............. | 73/861.24 |
| 4,258,565 | 3/1981 | Sawayama et al. ............ | 73/DIG. 4 |
| 4,307,619 | 12/1981 | Herzl ................................. | 73/861.24 |

FOREIGN PATENT DOCUMENTS

| | | | |
|---|---|---|---|
| 0148474 | 12/1978 | Japan ................................. | 73/861.22 |
| 0161968 | 12/1979 | Japan ................................. | 73/861.24 |
| 0161357 | 12/1979 | Japan ................................. | 73/861.24 |
| 0156811 | 12/1983 | Japan ................................. | 73/861.24 |

Primary Examiner—Herbert Goldstein
Attorney, Agent, or Firm—James R. Young

[57] ABSTRACT

This invention discloses a vortex shedding flowmeter comprising a vortex generating member disposed across one cross section of the flow passage and a vortex sensing member including a wing disposed across another cross section of the flow passage parallel to the vortex generating member, wherein one extremity of the wing is secured to a stocky container member housing a piezoelectric element by a flange of a thin diaphragm construction, which stocky container member is rigidly secured to the wall of the flow passage, while the other extremity of the wing is secured to the opposite side wall of the flow passage in a resilient manner.

10 Claims, 33 Drawing Figures

VORTEX SHEDDING FLOW METER WITH STRESS CONCENTRATION SIGNAL ENHANCEMENT

BACKGROUND OF THE INVENTION

In recent times, the vortex shedding flow meter has been emerging as one of the most popular flow meters, as it employs no moving parts subjected to wear and tear, has a rugged and sturdy construction suitable for applications involving extreme temperatures and pressures, and provides a highly accurate and reliable flow measurement on the volume flow rate of all types of fluids. Indeed, the vortex shedding flow meter can be made to a truly ideal flow meter only if a couple of major short comings existing with the present-day vortex shedding flow meter can be rid of. The most serious weakness in the vortex shedding flow meters commercially available at the present time is its inability to measure flows of gaseous media at low velocities. As the most popular means for detecting the vortices shed by the vortex generator includes detection of the bending of a mechanical probe or deflection of a diaphragm or movement of a target under pressure fluctuation, etc., there arises an inevitable difficulty in detecting weak vortices carrying very low levels of momentum, which are associated with flows of low density fluid medium at low velocity.

Another weakness in the existing technology of the vortex shedding flow meters is the noise removal. Since the vortex sensors detect the mechanical reaction of the probe to the action of vortices, the transducers pick up all other mechanical actions effecting the probe, which include the structural vibrations of pipe lines transmitted to the probe, low frequency acoustical noises penetrating across the pipe wall, noises associated with flow fluctuations unrelated to the vortices, etc. The noise problem becomes particularly serious when the probe has to detect a low velocity flow of a low density fluid. Although the ultrasonic means for detecting the wake created by the vortex generator provides a solution to the aforementioned weakness in the present-day vortex shedding flow meters, the vortex shedding flow meter with ultrasonic wake detection has its own weakness of a quite different nature, which includes the error introduced by the bubbles and particles suspended in the fluid medium, lack of the ruggedness and durability and the temperature and/or pressure limitations in the applicability, etc.

The primary object of the present invention is to provide a vortex shedding flow meter capable of measuring flow velocities of very wide range from very low velocity to very high velocity.

Another object is to provide a vortex shedding flow meter of high sensitivity and high accuracy.

A further object is to provide a vortex shedding flow meter of highly rugged and durable construction, and dependable and consistent performance.

Yet another object is to provide a vortex shedding flow meter of wide range of applications including extreme temperatures and pressures.

Yet a further object is to provide a vortex shedding flow meter including a vortex generating member of stiff elongated structure with a blunt cross section and a vortex sensing member of slender elongated structure with substantially flat cross section oriented substantially parallel to the direction of the flow wherein the vortex generating member and the vortex sensing member are disposed substantially parallel to one another and substantially perpendicular to the direction of the flow.

Still another object is to provide a substantially discontinuous junction at least at one extremity of the vortex sensing member of the slender elongated structure wherein the slender vortex sensing member abruptly extends to a stocky extremity experiencing an abrupt change in the size and shape of cross section; whereby a small amount of lateral deflection of the slender vortex sensing member created by the vortices produces a high stress concentration at the junction of discontinuous cross section.

Still a further object is to provide a vortex shedding flow meter including means for sensing stress or strain occuring in a concentrated form at the junction of discontinuous cross section, which sensing means is installed adjacent to the junction of discontinuous cross section intermediate the substantially flat midsection and the stocky extremity of the vortex sensing member.

These and other objects of the present invention will become clear as the description thereof proceeds.

Brief Description of the Figures

The present invention may be described with a great clarity and specificity by referring to the following figures.

DESCRIPTION OF ILLUSTRATED EMBODIMENTS

Figure 1:
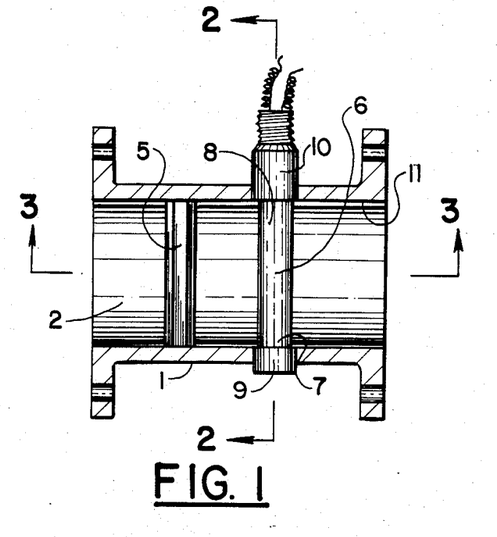
FIG. 1 illustrates a cross section of an embodiment of a vortex shedding flow meter constructed in accordance with the principles of the present invention.
Figure 3:
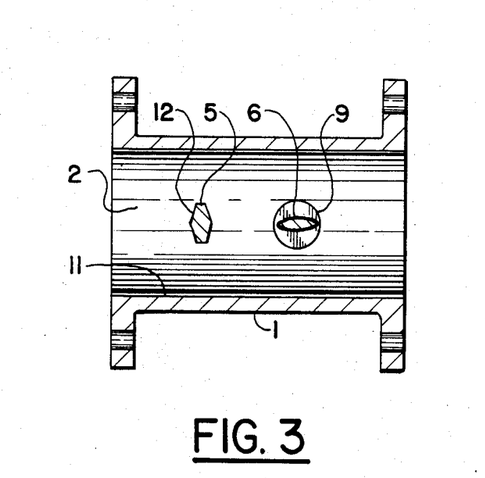
FIG. 3 illustrates a further cross section of the vortex shedding flow meter shown in FIG. 1.

In FIG. 1 there is illustrated a cross section of an embodiment of the vortex shedding flow meter constructed in accordance with the principles of the present invention, which cross section is taken along a plane including the central axis of the flow passage. The flow meter body 1 includes a straight-through flow passage 2 that extends from one extremity to the other extremity of the flow meter body 1 wherein each extremity includes coupling means for connecting the flow meter to a pipe line. A vortex generating member 5 of a stiff elongated structure with cross section of a blunt geometry is disposed across a cross section of the flow passage 2 in a substantially perpendicular angle with respect to the central axis of the flow passage 2. The two extremities of the vortex generating member 5 are affixed to two opposite portions of the wall of the flow passage in a nonremovable fashion by such means as welding as shown in the specific embodiment shown in FIG. 1 or in a removable fashion by such means as pin or bolt connections as shown in the specific embodiment shown in FIG. 33. A vortex sensing member 6 having a slender elongated midportion structure is disposed across another cross section of the flow passage 2 in a parallel arrangement with respect to the vortex generating member 5 at a downstream location thereof. As shown in FIG. 3, the slender, elongated midportion of this vortex sensing member 6 preferably has a transverse cross-section that is thin in dimension transverse to the central axis of the flow passage 2 and is wide in dimension parallel to the central flow passage 2. The two extremities 7 and 8 of the slender midportion of the vortex sensing member 6 extending to stocky extremities 9 and 10, respectively, experiencing abrupt changes in cross section from the slender cross section to a broader cross section. The stocky extremities 9 and 10 of the vortex sensing member 6 are rigidly affixed to the two diametrically opposite portions of the wall 11 of the flow passage 2. One of the two stocky extremities 10 of the vortex sensing member 6 includes a transducer element therein, which arrangement will be described in conjunction with FIG. 4. The signals on the vortex shedding frequencies detected by and transmitted from the transducer element installed within the stocky container member 10 of the vortex sensing member 6 is processed by a data processor 3 that converts the vortex shedding frequency to rate of flow through the flow passage, which data are displayed and/or transmitted to other flow measuring or controlling device by an output means 4.

Figure 2:
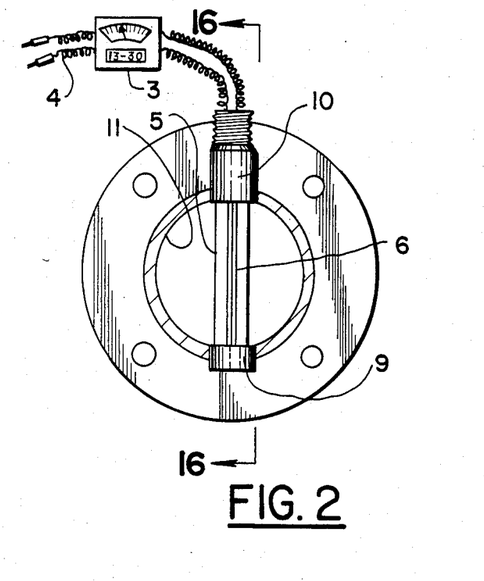
FIG. 2 illustrates another cross section of the vortex shedding flow meter shown in FIG. 1 taken along plane 2—2 as shown in FIG. 1.

In FIG. 2 there is illustrated a cross section of the vortex shedding flow meter shown in FIG. 1, that is taken along plane 2—2 as shown in FIG. 1. The slender midportion of the vortex sensing member 6 substantially lined up with the central axis of the flow passage contrasts the vortex generating member 5 having cross section of a blunt geometry where the blunt side of the cross section is disposed substantially perpendicular to the central axis of the flow passage.

In FIG. 3 there is illustrated another cross section of the vortex shedding flow meter shown in FIG. 1, which is taken along plane 3—3 as shown in FIG. 1. The cross section of a blunt geometry of the vortex generating member 5 is arranged in such a way that the broad side 12 of the vortex generating member 5 is disposed substantially perpendicular to the central axis of the flow passage obstructing the flow path. The substantially flat cross section of the slender midportion of the vortex sensing member 6 is lined up with the central axis of the flow passage.

Figure 4:
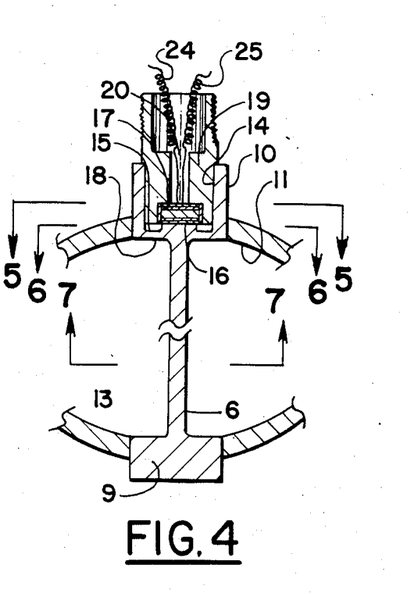
FIG. 4 illustrates a cross section of an embodiment of the vortex sensor assembly taken along a plane equivalent to plane 2—2 as shown in FIG. 1.

In FIG. 4 there is illustrated a cross section of the vortex sensing member 6 taken along a plane including the central axis of the vortex sensing member 6 and perpendicular to the central axis of the flow passage. The slender midportion 13 of the vortex sensing member 6 extends to one stocky extremity 9 experiencing a sharp change in the cross section while it extends to the other stocky container member 10 also experiencing a sharp change in the cross section area. Both of the stocky extremities extend through and are rigidly affixed to the two diametrically opposite portions of the wall 11 of the flow passage. The stocky container member 10 includes a bore 14 that has a bottom with an annular groove 15, providing a raised seat 16 for the transducer element 17 and an annular diaphragm 18 that resiliently connects the rigid combination of the slender midportion 13 and the raised seat 16 to the shell-like structure of the stocky container member 10. A transducer holding member 19 with hole 20 for wiring plugs up the bore 14 wherein the transducer element 17 placed on the raised seat 16 is preloaded against the raised seat 16 by the transducer holding member 19 that is pressed down against the transducer element 17 seating on the raised seat 16 and weld-connected to the end of the stocky container member 10 of the vortex sensing member 6.

Figure 5:
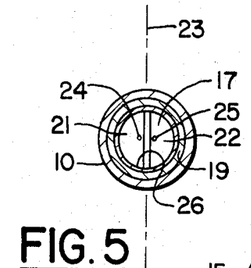
FIG. 5 illustrates another cross section of the vortex sensor assembly shown in FIG. 4 taken along plane 5—5 as shown in FIG. 4.

In FIG. 5 there is illustrated a cross section of the combination of the stocky container member 10 of the vortex sensing member 6 and the transducer holding member 19, which cross section is taken along plane 5—5 as shown in FIG. 4, showing the top of the transducer element 17 of a circular disc shape. The transducer element 17 includes a pair of sensors 21 and 22 divided from one another along a plane substantially including the cenytral axis 23 of the flow passage 11, from which a pair of conducting wires 24 and 25 extend, respectively. The transducer element 17 is electrically insulated from the stocky container member 10 of the vortex sensing element and the transducer holding member 19 by means of a pair of insulating discs sandwiching the transducer element and an insulating sleeve 26.

Figure 6:
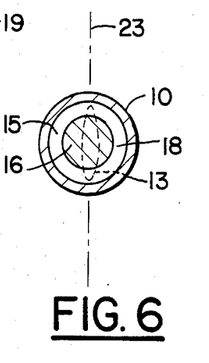
FIG. 6 illustrates a further cross section of the vortex sensor assembly shown in FIG. 4 taken along plane 6—6 as shown in FIG. 4.

In FIG. 6 there is illustrated another cross section of the stocky container member 10 of the vortex sensing member taken along plane 6—6 as shown in FIG. 4. The annular groove 15 provides a resilient annular diaphragm 18 connecting the combination of the raised seat 16 and the slender midportion 13 of the vortex sensing member to the shell-like structure of the stocky container member 10.

Figure 7:
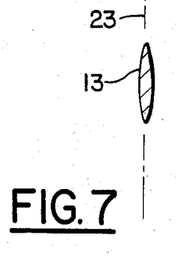
FIG. 7 illustrates yet another cross section of the vortex sensor assembly shown in FIG. 4 taken along plane 7—7 as shown in FIG. 4.

In FIG. 7 there is illustrated a cross section of the slender midportion 13 of the vortex sensing member 6 that is substantially lined up with the central axis 23 of the flow passage.

The vortex shedding flow meter illustrated in FIGS. 1–7 operates in the following principles: The vortex generating member 5 generates a train of vortices in the wake downstream thereof, which are shed from the two opposite lateral sides of the vortex generating member 5 in an alternating pattern at a frequency that is directly proportional to the velocity of the fluid medium moving through the flow passage divided by the lateral width of the vortex generating member. The wake behind the vortex generating member including the train of vortices generates lift force on the slender midportion 13 of the vortex sensing member 6 that changes the direction at the same frequency as the vortex shedding. The lift forces of alternating directions deflect the slender midportion 13 of the vortex sensing member in an oscillating mode at the same frequency as the vortex shedding and, consequently, the detection of the frequency of the alternating deflections of the slender midportion 13 of the vortex sensing member 6 enables one to detect the frequency of the vortex shedding, from which information on the velocity of the fluid medium and the volume or mass flow rate through the fluid passage is obtained. The vortex sensing member constructed in accordance with the principles of the present invention provides a unique and powerful advantage in that the vortex sensing member described in conjunction with FIGS. 4–7 mechanically preamplifies the signal associated with the vortex shedding from the vortex generating member by means of stress concentration taking place at the discontinuous junction between the slender midportion 13 and the stocky container member 10. As the slender midportion 13 is supported by the thin annular diaphragm 18 in a resilient manner, the fluid dynamic force of low magnitude associated with the vortices creates deflection of the slender midportion 13 of a magnitude easily measurable even in the low velocity regime. Furthermore, the thin annular diaphragm 18 provides only a little stiffness and, consequently, all the stress transferred from the slender midportion 13 to the stocky container member 10 passes through the transducer element 17 under a pressurized contact with the raised seat 16 in a highly concentrated form. As a consequence, emf between the pair of conducting wires 24 and 25 is mechanically preamplified before it is electrically amplified and processed. The dual amplification comprising the aforementioned mechanical preamplification and the final electrical amplification and processing of the vortex shedding frequency enables the vortex shedding flow meter of the present invention to detect the vortices which are too weak to be detected by many other existing vortex shedding flow meters. Another overwhelming advantage provided by the vortex shedding flow meter of the present invention is the noise elimination. The slender midportion 13 of the vortex sensing member 6 of light weight construction has a fixed end support by the stocky extremity 9, while it has a quasi simple support at the junction connected to the stocky container member 10. In other words, it is equivalent to a small mass supported by a very rigid spring, that has a large frictional damping surface. The natural resonance frequency of the slender midportion 13 of the vortex sensing member is high above the operating range of the vortex shedding frequency. The large surface area to mass ratio of the slender midportion 13 of the vortex sensing member is unresponsive to the low frequency structural vibration of the piping system, while it provides a powerful advantage in detecting fluid dynamic force. In other words, the particular embodiment of the vortex sensing member shown in FIG. 4 is sensitive to the fluid dynamic force because of its large streamlined surface area, while it is insensitive to the mechanical vibrations of external sources because of its small mass and because of its large fluid dynamic surface area that damps off rapidly any vibration induced by the mechanical vibration of external sources.

Figure 8:
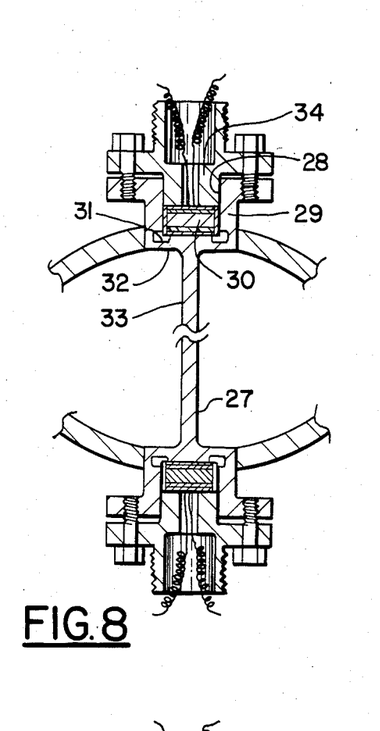
FIG. 8 illustrates a cross section showing an embodiment of the installation of a transducer elements in the vortex sensor assembly.

In FIG. 8 there is illustrated a cross section of another embodiment of the vortex sensing member 27 constructed in essentially the same way as that shown in FIG. 4 with a few exceptions. The bore 28 included in the stocky container member 29 has a diameter slightly greater than the diameter of the transducer pack 30, wherein the annular groove 31 providing a resilient annular diaphragm 32 supporting the flat midsection 33 of the vortex sensing member 27 cuts into the bottom of the bore 28 as well as to the cylindrical wall thereof. The transducer retainer 36 is fastened to the stocky container member 29 of the vortex sensing member 27 by a plurality of bolts, which arrangement enables one to replace the transducer pack 30.

In the specific embodiment shown in FIG. 8, another transducer element is installed within a cavity included in the other stocky container member of the vortex sensing member 27, which installation is arranged in the same way as the transducer element 30 is installed in a cavity included in the stocky container member 29 of the vortex sensing member 27. The dual transducer arrangement including a pair of transducers respectively included in the two stocky container members of the vortex sensing member provides advantages in that, firstly, signals from the two transducer elements can be added to one another to increase the intensity of the signal indicating the vortex shedding frequency and, secondly, the palarization of the crystals included in the two transducer elements and wiring therebetween can be arranged in such a way that the two transducers add up one another in sensing and transmitting the vortex shedding signals, while they cancel each other on noise signals associated with the structural vibration of the pipe lines and other mechanical vibrations occuring in the ambient surroundings.

Figure 9:
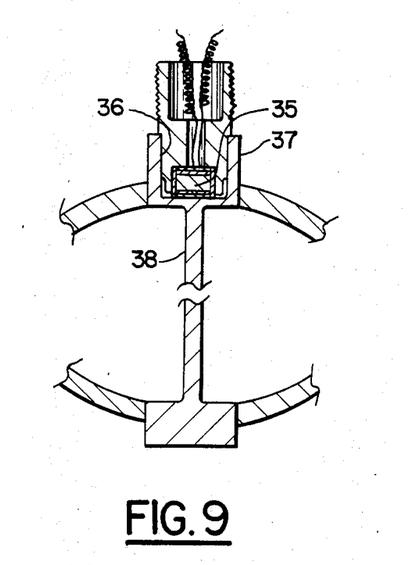
FIG. 9 illustrates a cross section showing another embodiment of the installation of a transducer element in the vortex sensor assembly.

In FIG. 9 there is illustrated a cross section of a further embodiment of the vortex sensing member constructed in essentially the same way as that shown in FIG. 4 with one exception being that the transducer pack 35 is placed directly on the substantially flat bottom of the bore 36 included within the stocky container member 37 of the vortex sensing member 38. It should be noticed that there is a clearance between the bottom of the bore 36 and the tip of the transducer retainer as the tip of the transducer retainer is slightly recessed from the face of the transducer 35 under a pressure contact with the bottom of the bore 36.

Figure 10:
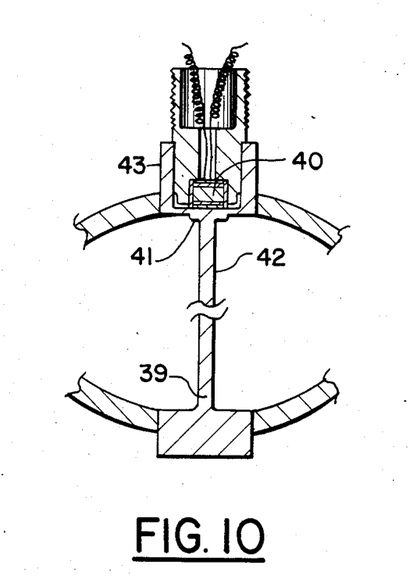
FIG. 10 illustrates a cross section showing a further embodiment of the installation of a transducer element in the vortex sensor assembly.

In FIG. 10 there is illustrated a cross section of yet another embodiment of the vortex sensing member 39 which is constructed in essentially the same way as that shown in FIG. 9. The seating arrangement of the transducer pack 40 is provided by the shoulder structure 41 added to the junction where the slender midportion 42 of the vortex sensing member 39 extends to the stocky container member 43. It should be understood that different arrangements for the installation of the crystal pack shown in FIGS. 4, 8, 9 and 10 may include the transducer retainer permanently connected to the stocky container member housing the transducer element by welding or clamping or removably connected by a threaded fastening means.

Figure 11:
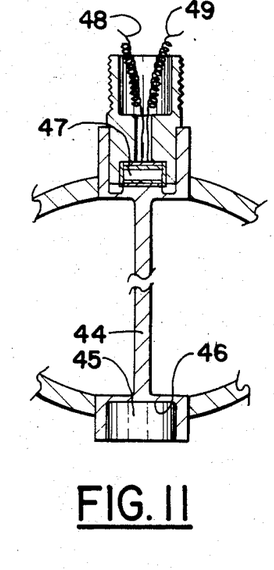
FIG. 11 illustrates a cross section of a vortex sensor assembly showing the transition from the substantially flat midsection to two stocky extremities affixed to the wall of the flow passage.

In FIG. 11 there is illustrated a cross section of an embodiment of the vortex sensing member 44 constructed in essentially the same way as that shown in FIG. 4, wherein the stocky extremity 45 opposite to that housing the transducer element is bored out to provide a diaphragm 46, providing a quasi-simple support for the slender midportion of the vortex sensing member at both ends. Such an arrangement provides an increased flexibility for the slender midportion of the vortex sensing member and, consequently, boost the level of the mechanical preamplication of the vortex shedding signal picked up by the transducer element 47 in the form of emf between the two conducting wires 48 and 49 extending from the two elements of piezo-electric sensors included in the transducer element 47.

Figure 12:
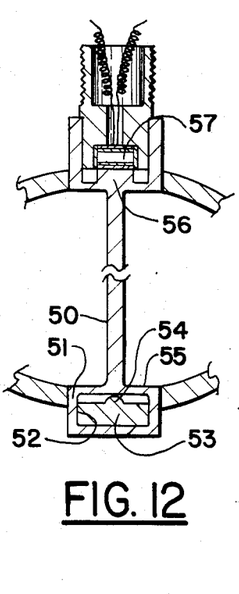
FIG. 12 illustrates another embodiment of the securement of the vortex sensing member to the wall of the flow passage.

In FIG. 12 there is shown another embodiment of the arrangement for the junction between the slender midportion 50 of the vortex sensing member and the stocky extremity 51, wherein the bore 52 included in the stocky extremity 51 has a plug 53 welded thereto. The plug 53 includes a centrally located boss or ridge 54 lined up parallel to the cross section of the flat midsection 50, that supports the diaphragm 55 without hindering the flexing movement of the flat midsection 50 of the vortex sensing member. The inclusion of the plug 53 with a supporting boss or ridge 54 serves a dual purpose in that it maintains a positive pressure between the raised seat 56 and the transducer element 57 and that it supports the diaphragm 55 against the fluid pressure in the flow passage.

Figure 13:
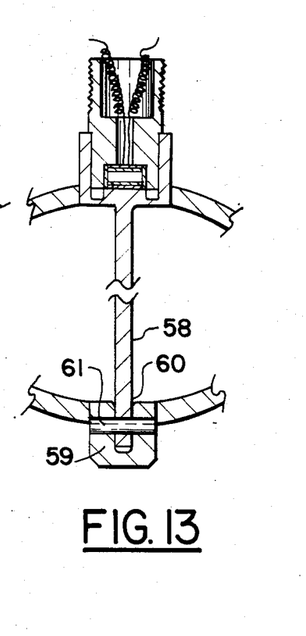
FIG. 13 illustrates a further embodiment of the securement of the vortex sensing member to the wall of the flow passage.

In FIG. 13 there is illustrated a further embodiment of the arrangement for the junction between the flat midsection 58 of the vortex sensing member and the stocky extremity 59 wherein the free extremity 60 of the flat midsection 58 engages a groove included in the stocky extremity 59 and secured thereto by a pin 61.

Figure 14:
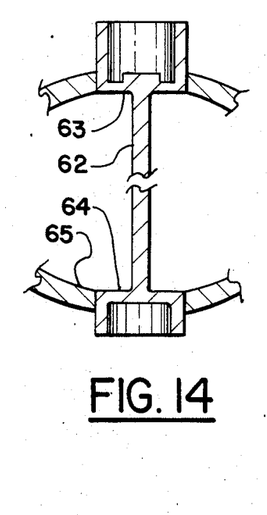
FIG. 14 illustrates yet another embodiment of the securement of the vortex sensing member to the wall of the flow passage.

In FIG. 14 there is illustrated yet another embodiment of the arrangement for the junction between the flat midsection 62 of the vortex sensing member and the stocky extremities thereof. The shoulders 63 and 64 included in the junction are shaped to conform with the circular cylindrical surface of the wall 65 of the flow passage. For the brevity of the illustration, the transducer element and its retainer are omitted from the illustration shown in FIG. 14.

Figure 15:
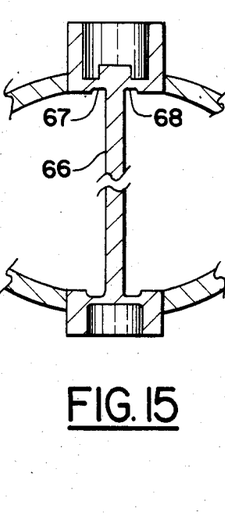
FIG. 15 illustrates yet a further embodiment of the securement of the vortex sensing member to the wall of the flow passage.

In FIG. 15 there is illustrated yet a further embodiment of the arrangement for the junction between the flat midsection 66 of the vortex sensing member and the stocky extremities thereof, wherein a pair of linear grooves 67 and 68 sandwiching the flat midsection 66 are incorporated into shoulders included in the junction. It should be understood that different combinations for the installation of the transducer element and those for the arrangement of the junctions between the flat midsection and the stocky extremities of the vortex sensing member shown in FIGS. 4-15 may be selectively utilized to construct a vortex sensing element particularly adapted to certain operating conditions.

Figure 16:
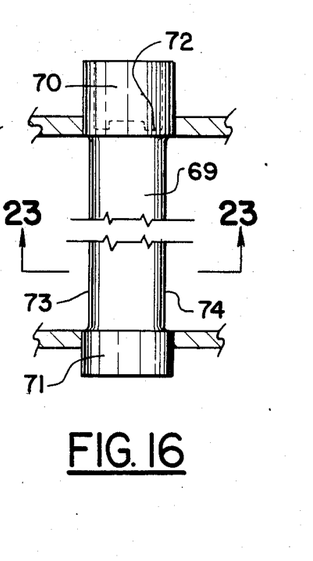
FIG. 16 illustrates a view of the vortex sensor assembly viewed across plane 16—16 as shown in FIG. 2.

In FIG. 16 there is illustrated a view of a substantially flat side of the flat midsection 69 of a vortex sensing element secured to the wall of the fluid passage by means of the two stocky extremities 70 and 71 affixed to the wall of the fluid passage by welding, which view is seen through plane 16—16 as shown in FIG. 2. It should be noticed that, in this particular embodiment, the cord length of the slender midportion 69 is slightly greater than the outer diameter of the annular diaphragm 72 and, consequently, the leading and trailing edges 73 and 74 are directly supported by the shell structure of the stocky container member 70.

Figure 17:
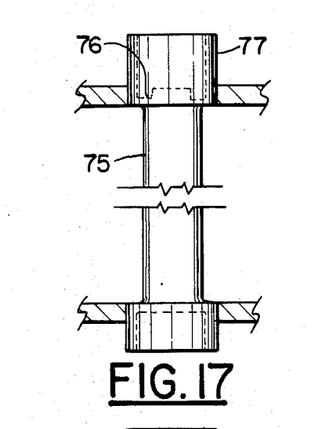
FIG. 17 illustrates a side view of an embodiment of the vortex sensing member.

In FIG. 17 there is illustrated a view of a substantially flat side of the slender midportion 75 of the vortex sensing element. The cord length of the wing is less than the outer diameter of the annular diaphragm 76 and, consequently, in this particular embodiment, the extremity of the slender midportion extending to the stocky container member 77 housing the transducer element is more or less supported by the annular diaphragm 76 all around thereof.

Figures 18, 19:
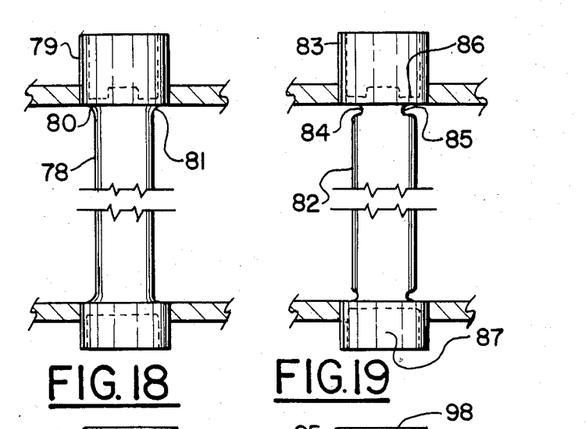
FIG. 18 illustrates a side view of another embodiment of the vortex sensing member.
FIG. 19 illustrates a side view of a further embodiment of the vortex sensing member.

In FIG. 18 there is illustrated a cross section of another embodiment of junction where the slender midportion 78 extends to the stocky container member 79 housing the transducer element, which embodiment is essentially the same as that shown in FIG. 17 with one exception being that the radii 80 and 81 are included along the leading and trailing edges of the slender midportion at the junction between the slender midportion 78 and the stocky container member 79 whereby, the leading and trailing edges of the slender midportion are directly supported by the shell structure of the stocky container member 79.

In FIG. 19 there is illustrated a cross section of another embodiment of the junction where the slender midportion 82 extends to the stocky container member 83 housing the transducer element. The notches or undercuts 84 and 85 are cut into the leading and trailing edges of the slender midportion at the junction between the slender midportion 82 and the stocky container member 83 in order to provide a further resiliency for annular diaphragm 86 supporting the slender midportion 82. A similar arrangement including notches or undercuts may be employed at the junction where the slender midportion 82 extends to the other stocky extremity 87 opposite to that housing the transducer element. The embodiments shown in FIGS. 16–19 are applicable to the construction of the vortex sensing element in a selective and combinatorial manner, wherein the cord length of the flat midsection of the vortex sensing element is approximately equal to or less than the diameter of the stocky extremities of the vortex sensing element.

Figure 20:
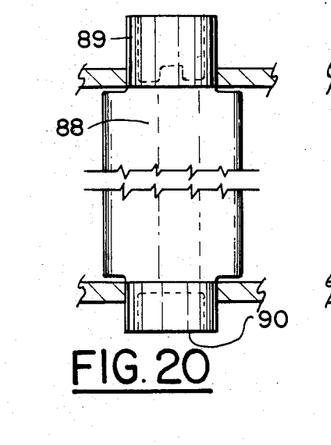
FIG. 20 illustrates a side view of yet another embodiment of the vortex sensing member.

In FIG. 20 there is illustrated a vortex sensing element wherein the cord length of the slender midportion 88 is greater than the diameter of the stocky extremities 89 and 90 of the vortex sensing element. At the junction where the slender midportion 88 extends to the stocky extremity, the leading and trailing edge portions of the slender midportion 88 are trimmed down to a width that matches the outside diameter of the stocky extremities.

Figure 21:
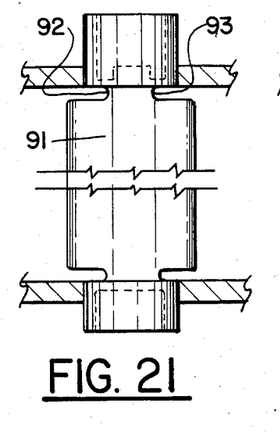
FIG. 21 illustrates a side view of yet a further embodiment of the vortex sensing member.

In FIG. 21 there is shown another vortex sensing element with the slender midportion 91 of large chord length that extends to the stocky extremities of small diameter, wherein notches or undercuts 92, 93, etc. are included along the leading and trailing edges of the flat midsection 91 at the junction where the slender midportion 91 extends to the stocky extremities. The notches or undercuts 92, 93, etc. accomplish the same goal as described in conjunction with FIG. 19.

Figure 22:
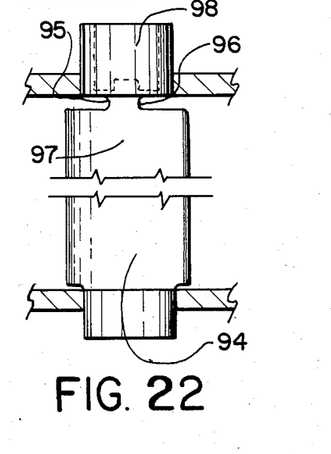
FIG. 22 illustrates a side view of still another embodiment of the vortex sensing member.

In FIG. 22 there is illustrated a further vortex sensing element 94 that is essentially the same as that shown in FIG. 21 with one exception being that the pair of notches or undercuts 95 and 96 are included at one junction only where the slender midportion 97 extends to the stocky container member 98 housing the transducer element. Such an arrangement is useful when a high level stress concentration is required in transmitting the stress to the transducer element while an adequate level of stiffness is required in supporting the slender midportion 97 by the stocky extremities of the vortex sensing element 94.

Figure 23:
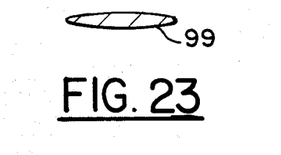
FIG. 23 illustrates a cross section of a typical flat midsection of the vortex sensing member taken along plane 23—23 as shown in FIG. 16.

In FIG. 23 there is illustrated a cross section of the slender midportion of the vortex sensing member taken along a plane 23—23 as shown in FIG. 1. The cross section of the slender midportion 99 should be of a thin, flat geometry with a smooth contour that creates a minimum disturbance on the motion of the fluid medium flowing thereby. The thin flat geometry of the cross section of the slender midportion of the vortex sensing member is required, firstly, to generate lift forces of possibly the largest magnitude resulting from the vortices shed by the vortex generating member, secondly, to provide a sufficient flexibility necessary to produce deflections resulting in stresses of measurable magnitude and thirdly, to minimize the inertia effect on ringing noises whereby the deflections induced by the mechanical noise are damped immediately because of the combination of a small mass and a large surface area of frictional damping.

Figure 24:
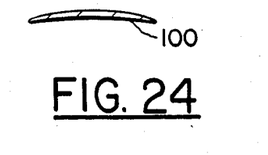
FIG. 24 illustrates a cross section of another embodiment of the flat midsection of the vortex sensing member.

In FIG. 24 there is illustrated a cross section of the slender midportion of another vortex sensing member 100, which has a finite camber that generates lift forces in alternating directions in an asymmetric mode. Alternating lift forces in an asymmetric mode sometimes provides an advantage for sensing the vortex shedding.

Figure 25:
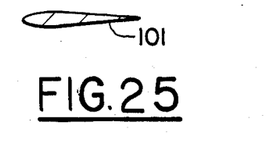
FIG. 25 illustrates a cross section of a further embodiment of the flat midsection of the vortex sensing member.

In FIG. 25 there is illustrated a cross section of the slender midportion of a further vortex sensing member 101, which is a typical airfoil shape of zero camber.

Figure 26:
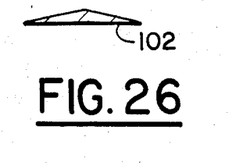
FIG. 26 illustrates a cross section of yet another embodiment of the flat midsection of the vortex sensing member.

In FIG. 26 there is illustrated a cross section of the slender midportion of yet another vortex sensing member 102 that is substantially of a flattened triangle with slightly rounded corners.

Figure 27:
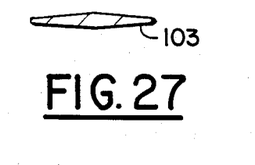
FIG. 27 illustrates a cross section of yet a further embodiment of the flat midsection of the vortex sensing member.

In FIG. 27 there is illustrated a cross section of the slender midportion of yet a further vortex sensing member 103 that is substantially of a flattened diamond shape with slightly rounded corners.

Figure 28:
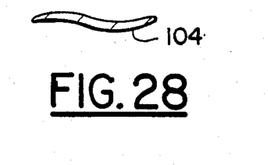
FIG. 28 illustrates a cross section of still another embodiment of the flat midsection of the vortex sensing member.

In FIG. 28 there is illustrated a cross section of the slender midportion of still another vortex sensing member 104 that is substantially of the shape of tilde mark. The typical cross sections shown in FIGS. 23–28 are a few examples of many that can be incorporated into the construction of the slender midportion of the vortex sensing member as a matter of design.

Figure 29:
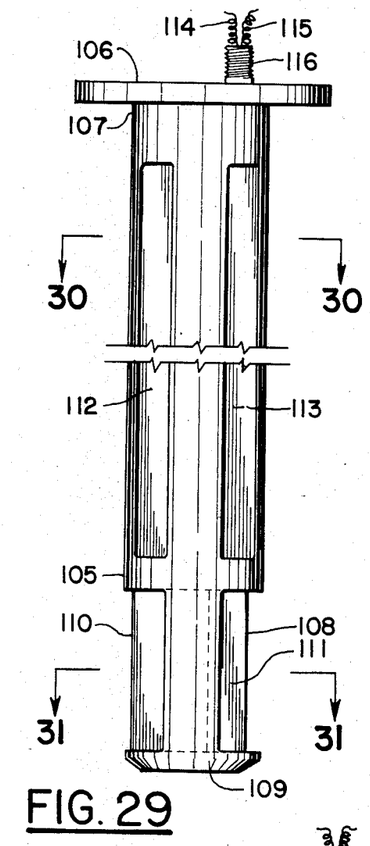
FIG. 29 illustrates a cross section of an insertion type vortex shedding flow meter constructed in accordance with the principles of the present invention.

In FIG. 29 there is illustrated an insertion type vortex shedding flow meter constructed in accordance with the principles of the present invention. The body 105 of the flow meter is constructed of a circular cylindrical bar with a mounting flange 106 affixed to one extremity 107 thereof. The flow passage 108 comprises an opening of a substantially rectangular shape disposed through the other extremity 109 of the cylindrical bar, wherein the central axis of the flow passage 108 is substantially perpendicular to the central axis of the cylindrical bar constituting the body of the flow meter. The vortex generating member 110 of an elongated structure having cross section of a blunt geometry is disposed across a cross section of the flow passage adjacent one extremity of the flow passage in a configuration substantially parallel to the central axis of the cylindrical bar constituting the flow meter body 105. The vortex sensing member 111 of an elongated structure with a slender midportion is disposed across another cross section of the flow passage 108 adjacent to the other extremity of the flow passage in a configuration substantially parallel to the vortex generating member 110. The portion of the flow meter body intermediate the mounting flange 106 and the flow passage 108, that supports the assembly of the flow sensing apparatus installed within the flow passage 108 in an extending and overhanging relationship, includes a plurality of windows 112, 113, etc., which minimizes the obstruction of the flow of the fluid medium through a large diameter pipe. The insertion type vortex shedding flow meter is inserted into the large diameter pipe through a hole included in a flange affixed on the pipe wall, to which flange the mounting flange 106 is secured to. In General, the insertion type vortex shedding flow meter is inserted in a 90 degree angle to the central axis of the pipe wherein the central axis of the flow passage 108 of the vortex shedding flow meter roughly lines up with the central axis of the pipe. The pair of conducting wires 114 and 115 extending from the transducer element installed in one stocky extremity of the vortex sensing member 111 are routed through a hole disposed in rib included in the supporting section of the flow meter body 105 and exit therefrom through a wiring conduit 116.

Figure 30:
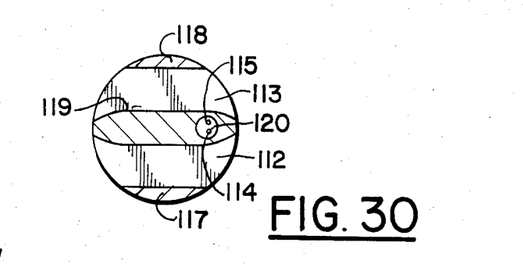
FIG. 30 illustrates a cross section of the insertion type vortex shedding flow meter shown in FIG. 29 taken along plane 30—30 as shown in FIG. 29.

In FIG. 30 there is illustrated a cross section of the insertion type vortex flow meter shown in FIG. 29 taken along plane 30—30 as shown in FIG. 29. The windows 112 and 113 are cut out leaving a pair of slender ribs 117 and 118 on two diametrically opposite sides and a thick rib 119 therebetween, wherein the thick rib 119 includes an axial hole 100 providing a conduit for the conducting wires 114 and 115. The leading and trailing edges of the ribs 117, 118 and 119 may be shaped to a roundness to enhance the smooth flow of the fluid medium therearound.

Figure 31:
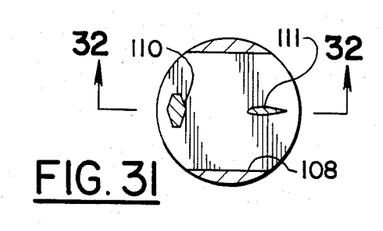
FIG. 31 illustrates another cross section of the insertion type vortex shedding flow meter shown in FIG. 29 taken along plane 31—31 as shown in FIG. 29.

In FIG. 31 there is illustrated a cross section of the flow passage 108 included in the insertion type vortex shedding flow meter shown in FIG. 29, which cross section is taken along plane 31—31 as shown in FIG. 29. The vortex generating member 110 and the vortex sensing member 111 of the same construction as those elements shown in FIGS. 1-4, respectively, are installed within the flow passage 108 in the same way as described in conjunction with FIGS. 1-4.

Figure 32:
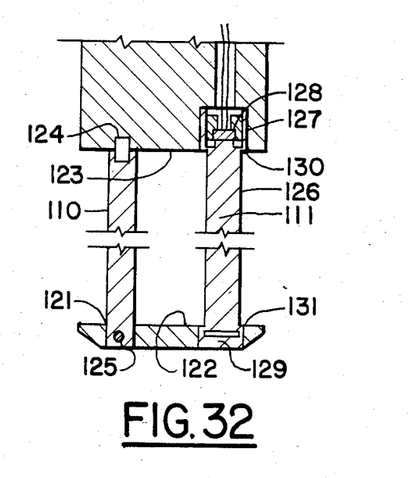
FIG. 32 illustrates a further cross section of the insertion type vortex shedding flow meter shown in FIG. 29 taken along plane 32—32 as shown in FIG. 31.

In FIG. 32 there is illustrated a cross section of the flow passage 108 including the vortex generating member 110 and the vortex sensing member 111, which cross section is taken along a plane 32—32 as shown in FIG. 31. The vortex generating member 110 engages and extends through a hole 121 disposed through the far side wall 121 of the flow passage, which is removably secured to the near side wall 123 of the flow passage by at least one pin 124 disposed parallel to the central axis of the circular cylindrical member constituting the flow meter body 106 at one extremity and secured to the far side wall 122 of the flow passage by at least another pin or screw 125 disposed perpendicular to the central axis of the circular cylindrical body 105 at the other extremity thereof. Of course, the vortex generating member 110 may be weld connected to the walls of the flow passage. The vortex sensing member 111 including a slender midportion 126 and a first stocky container member 127 housing the transducer element 128 and a second stocky extremity 129 is secured to the near and far side walls of the flow passage as the two stocky extremities respectively engage the two holes 130 and 131 included in the two opposite walls, respectively, wherein the two stocky extremities are permanently connected to the flow meter body by welding as shown in the illustrated embodiment or may be removably connected by screw means. The insertion type vortex shedding flow meter operates in the same principles as those described in conjunction with FIGS. 1-4. The various embodiments of the vortex sensing member in the installation of the transducer element shown in FIGS. 4-15 and those in the construction of the junction where the slender midportion extends to the stocky container member thereof shown in FIGS. 16-22 as well as the different cross section of the slender midportion shown in FIGS. 23-28 may be selectively and combinatively incorporated into the construction of the insertion type vortex shedding flow meter shown in FIGS. 29-32.

Figure 33:
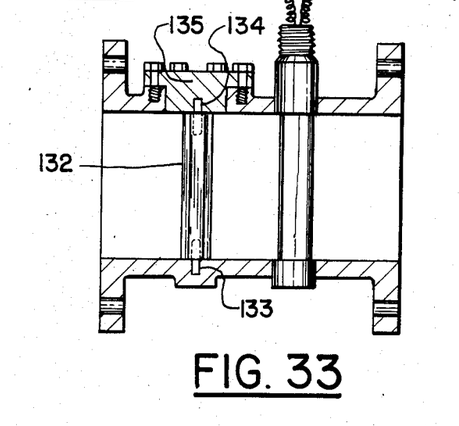
FIG. 33 illustrates a cross section of a vortex shedding flow meter constructed in accordance with the principles of the present invention wherein the vortex generating member is installed in a removable arrangement.

In FIG. 33, there is illustrated a cross section of a vortex shedder flow meter constructed in essentially the same way as that shown in FIG. 1 with one exception being that the vortex generating member 132 is removably secured to the wall of the flow passage by means of a plurality of pins 133, 134, etc. and an adapter cap 135 affixed to the flange or seat built in the pipe wall. As the vortex shedding frequency is directly proportional to the fluid velocity divided by the width of the cross section of the vortex generating body, it is imperative to check the change in the width of the vortex generating member due to abrasion or errosion. Consequently, a removable installation of the vortex generating member provides an advantage over a permanent installation in view that the former installation enables one to examine and replace the vortex generating member.

Among all the details of the construction of the vortex shedding flow meter described in FIGS. 1-33, the mechanical preamplification of the vortex shedding signal, that is realized, firstly, by the airfoil like thin sections with "a large fluid dynamic surface area and a small mass" which produces measurable deflections created by the alternating lift forces resulting from the vortices and, secondly, the transmission of the alternating stresses resulting from the aforementioned deflection to the transducer element in an intensified form by this method of "stress concentration", is the single most important break-through in the technology related to the vortex shedding flow meters.

While the principles of the present invention have now been made clear by the illustrative embodiments, there will be immediately obvious to those skilled in the art many modifications in the structures, arrangement, porportions, elements and materials which are particularly adapted to the specific working environments and particular operating conditions in the practice of the invention without departing from those principles.

We claim:

1. A vortex shedding flowmeter comprising in combination:

(a) a body including a wall that defines a flow passage extending from one extremity to the other extremity of said body;

(b) vortex generating means for shedding periodic vortices in a fluid flowing in said flow passage, said vortex generating means being disposed across a first cross-section of said flow passage and being oriented substantially perpendicular to the central axis of said flow passage;

(c) a vortex sensing member disposed across a second cross section of said flow passage substantially parallel to said vortex generating member, said first vortex sensing member having a slender, elongated midportion with a thin cross-sectional dimension oriented generally transverse to the central axis of said passage and a wide cross-sectional dimension oriented generally parallel to the central axis of said flow passage, one extremity of said slender, elongated midportion of said vortex sensing member being supported by a flange of a thin diaphragm construction secured to a stocky container member having a cavity therein adjacent to said flange of a thin diaphragm construction providing an abrupt transition in the cross section from said slender, elongated midportion of said vortex sensing member to said stocky container member, said stocky container member being secured to the wall of said flow passage; and (d) at least one transducer means contained within said cavity in contact with said flange of a thin diaphragm construction for converting alternating stresses on said flange of a thin diaphragm construction created by alternating lift forces on the slender, elongated midportion of said vortex sensing member to an electrical signal such that said transducer means detects the frequency of alternating lift forces created by the vortices periodically generated by said vortex generating member as a measure of velocity of a fluid moving through said flow passage.

2. The combination as set forth in claim 1 wherein said combination includes data processor means electrically connected to said transducer means for converting vortex shedding frequency to flow data.

3. The combination as set forth in claim 1 wherein the other extremity of said slender, elongated midportion of said vortex sensing member is secured to the wall of said flow passage.

4. The combination as set forth in claim 1 wherein the other extremity of said slender, elongated midportion of said vortex sensing member is removably secured to the wall of said flow passage.

5. The combination as set forth in claim 1 wherein said transducer means comprises a pair of piezo-electric elements disposed opposite to one another on either side of a line defined by the intersection of said slender, elongated midportion with the diaphragm, wherein said pair of piezo-electric elements generates alternating electromotive forces across said pair of piezo-electric elements at the same frequencies as the alternating lift forces on said slender, elongated midportion of said vortex sensing member produced by the vortices shed by said vortex generating means.

6. An insertion type vortex shedding flowmeter for mounting in the wall of a flow pipe, comprising in combination:

(a) an elongated cylindrical body having a flow passage extending transversely therethrough from one cylindrical side to the other cylindrical side of said body and disposed at one longitudinal extremity of said body, said body further including securing means disposed at the other longitudinal extremity of said body for securing said body to a pipe wall in such a manner that said body extends from the pipe wall toward a central portion of a cross section of the pipe so that the central axis of said flow passage generally lines up parallel to the central axis of the pipe;

(b) vortex generating means for shedding periodic vortices in said flow passage, said vortex generating means being disposed across a first cross-section of a said flow passage and being oriented substantially perpendicular to the central axis of said flow passage;

(c) a vortex sensing member disposed across a second cross section of said flow passage substantially parallel to said vortex generating member, said vortex sensing member having a slender, elongated midportion with a thin cross-sectional dimension oriented generally transverse to the central axis of said passage and a wide cross-sectional dimension oriented generally parallel to the central axis of said flow passage, one extremity of said slender, elongated midportion of said vortex sensing member being supported by a flange of a thin diaphragm construction secured to a stocky container member having a cavity adjacent to said flange of a thin diaphragm construction, said flange providing an abrupt transition in the cross section from said slender, elongated midportion of said vortex sensing member to said stocky container member, said stocky container member being secured to the wall of said flow passage; and (d) at least one transducer means contained within said cavity in contact with said flange of a thin diaphragm construction for converting alternating stresses on said flange of a thin diaphragm construction created by alternating lift forces on the slender, elongated midportion of said vortex sensing member to an electrical signal such that said transducer means detects the frequency of alternating lift forces created by the vortices periodically generated by said vortex generating member as a measure of velocity of a fluid moving through said flow passage.

7. The combination as set forth in claim 6 wherein said combination includes data processor means electrically connected to said transducer means for converting vortex shedding frequency to flow data.

8. The combination as set forth in claim 6 wherein the other extremity of said slender, elongated midportion of said vortex sensing member is secured to the wall of said flow passage.

9. The combination as set forth in claim 6 wherein the other extremity of said slender, elongated midportion of said vortex sensing member is removably secured to the wall of said flow passage.

10. The combination as set forth in claim 6 wherein said transducer means comprises a pair of piezo-electric elements disposed opposite to one another on either side of a line defined by the intersection of said slender, elongated midportion with the diaphragm, wherein said pair of piezo-electric elements generates alternating electromotive forces across said pair of piezo-electric elements at the same frequencies as the alternating lift forces on said slender, elongated midportion of said vortex sensing member produced by the vortices shed by said vortex generating means.

* * * * *

UNITED STATES PATENT AND TRADEMARK OFFICE
CERTIFICATE OF CORRECTION

PATENT NO.  : 4,699,012

DATED       : October 13, 1987

INVENTOR(S) : Hyok S. Lew and Louis T. Yoshida

It is certified that error appears in the above-identified patent and that said Letters Patent is hereby corrected as shown below:

In the Abstract:
In Line 4, delete "wing" and substitute --slender midportion--.
In Line 5, delete "wing" and substitute --slender midportion--.
In Line 7 & 8, delete "piezoelectric" and substitute --piezo-electric--.

In the Description of Illustrated Embodiments:
In Column 6, Line 60, delete "flat midsection" and substitute --slender midportion--.
In Column 7, Line 12, delete "palarization" and substitute --polarization--.
In Column 8, Line 9 & 10, delete "flat midsection" and substitute --slender midportion--.
In Column 8, Line 12, delete "flat midsection" and substitute --slender midportion--.
In Column 8, Line 16, delete "flat midsection" and substitute --slender midportion--.
In Column 8, Line 25, delete "flat midsection" and substitute --slender midportion--.
In Column 8, Line 27, delete "flat midsection" and substitute --slender midportion--.
In Column 8, Line 32, delete "flat midsection" and substitute --slender midportion--.
In Column 8, Line 37, delete "flat midsection" and substitute --slender midportion--.
In Column 8, Line 50, delete "wing" and substitute --slender midportion--.

UNITED STATES PATENT AND TRADEMARK OFFICE
CERTIFICATE OF CORRECTION

PATENT NO. : 4,699,012

DATED : October 13, 1987

INVENTOR(S) : Hyok S. Lew and Louis T. Yoshida

It is certified that error appears in the above-identified patent and that said Letters Patent is hereby corrected as shown below:

In Column 11, Line 61, delete "shedder" and substitute --shedding--.

Signed and Sealed this

Eighteenth Day of April, 1989

Attest:

DONALD J. QUIGG

Attesting Officer

Commissioner of Patents and Trademarks